(12) United States Patent
Chang et al.

(10) Patent No.: US 11,009,712 B2
(45) Date of Patent: May 18, 2021

(54) HEAD-MOUNTED DISPLAY DEVICE

(71) Applicant: HTC Corporation, Taoyuan (TW)

(72) Inventors: Li-Hsun Chang, Taoyuan (TW);
Kuan-Ying Ou, Taoyuan (TW);
Chen-Fu Chang, Taoyuan (TW);
Tian-Jia Hsieh, Taoyuan (TW)

(73) Assignee: HTC Corporation, Taoyuan (TW)

( * ) Notice: Subject to any disclaimer, the term of this patent is extended or adjusted under 35 U.S.C. 154(b) by 49 days.

(21) Appl. No.: 16/255,827

(22) Filed: Jan. 24, 2019

(65) Prior Publication Data
US 2019/0339532 A1 Nov. 7, 2019

Related U.S. Application Data

(60) Provisional application No. 62/666,105, filed on May 3, 2018.

(51) Int. Cl.
*G06F 1/16* (2006.01)
*G02B 27/01* (2006.01)

(52) U.S. Cl.
CPC ..... *G02B 27/0176* (2013.01); *G02B 27/0149* (2013.01); *G06F 1/163* (2013.01); *G02B 2027/0154* (2013.01)

(58) Field of Classification Search
CPC ....... G06F 3/013; G06F 1/163; G02B 27/017; G02B 27/0149; G02B 27/0176; G02B 2027/0154; A63F 13/26

(Continued)

(56) References Cited

U.S. PATENT DOCUMENTS 5,991,085 A * 11/1999 Rallison ............... G02B 27/017
345/8
6,256,798 B1 7/2001 Egolf et al.
(Continued)

FOREIGN PATENT DOCUMENTS

CN 106104361 11/2016
CN 205880367 1/2017
(Continued)

OTHER PUBLICATIONS

"Search Report of Europe Counterpart Application", dated Sep. 5, 2019, p. 1-p. 4.
(Continued)

*Primary Examiner* — Abdul-Samad A Adediran
(74) *Attorney, Agent, or Firm* — JCIPRNET

(57) ABSTRACT

A head-mounted display device includes a wearable assembly, an adjusting module and a control module. The wearable assembly is suitable for wearing to a user's head. The adjusting module is movably coupled to the wearable assembly, and includes a transmission mechanism and a driving element. The transmission mechanism is movably coupled to the wearable assembly, and the driving element is coupled to the transmission mechanism. The control module is electrically connected to the driving element. When the control module outputs a control signal to the driving element, the driving element drives the transmission mechanism to actuate, such that the transmission mechanism drives the wearable assembly along with driving of the driving element to change a girth of the wearable assembly to fit heads of different users.

13 Claims, 9 Drawing Sheets

(58) Field of Classification Search
USPC .................................................. 345/8, 174
See application file for complete search history.

(56) References Cited

U.S. PATENT DOCUMENTS

| | | |
|---|---|---|
| 8,769,844 B2 | 7/2014 | Beers et al. |
| 10,747,005 B1* | 8/2020 | Sullivan ............. G02B 27/0149 |
| 2015/0234189 A1* | 8/2015 | Lyons ..................... A63F 13/26 |
| | | 345/174 |
| 2015/0359286 A1 | 12/2015 | Sommers et al. |
| 2016/0098138 A1 | 4/2016 | Park et al. |
| 2018/0046147 A1 | 2/2018 | Aghara et al. |
| 2018/0364754 A1* | 12/2018 | Sullivan .................. G06F 1/163 |
| 2019/0072772 A1* | 3/2019 | Poore ...................... G06F 3/013 |

FOREIGN PATENT DOCUMENTS

| | | |
|---|---|---|
| CN | 205982827 | 2/2017 |
| CN | 106933370 | 7/2017 |
| CN | 107290849 | 10/2017 |
| CN | 107797288 | 3/2018 |
| CN | 207067532 | 3/2018 |
| EP | 0675382 | 10/1995 |
| JP | 06057509 | 3/1994 |
| TW | 352890 | 2/1999 |
| WO | 2010123456 | 10/2010 |

OTHER PUBLICATIONS

"Office Action of Taiwan Counterpart Application," dated Apr. 30, 2019, p. 1-p. 6.
"Office Action of Europe Counterpart Application,", dated Sep. 18, 2019, p. 1-p. 6.
"Office Action of Europe Counterpart Application", dated Jun. 9, 2020, p. 1-p. 5.
Office Action of China Counterpart Application, dated Mar. 3, 2021, pp. 1-11.

* cited by examiner

HEAD-MOUNTED DISPLAY DEVICE

CROSS REFERENCE TO RELATED APPLICATION

This application claims the priority benefit of U.S. provisional application Ser. No. 62/666,105, filed on May 3, 2018. The entirety of the above-mentioned patent application is hereby incorporated by reference herein and made a part of specification.

BACKGROUND

Technical Field

The application relates to a head-mounted display device, and particularly relates to head-mounted display device capable of automatically adjusting a girth to fit different user's heads.

Description of Related Art

Along with development of the technology industry, the types, functions, and usage of display devices are becoming more diverse, and wearable display devices that can be directly attached to user's bodies are also developed. There are many kinds of head-mounted display devices, and taking an eye mask type head-mounted display device as an example, after the user wears such type of the display device, besides that the user may view a three-dimensional image, the image may change along with rotation of the user's head, which provides the user with a more immersive experience.

In order to facilitate the user to wear the head-mounted display device, a headband is usually provided on the head-mounted display device. Such headband may be made of a soft material, such as plastic or cloth. When cloth is used as the material of the headband, two ends of the headband may be fixed by using a Velcro tape. When plastic is used as the material of the headband, a rear part of the headband may be configured with a gear, and the user may drive the gear through a knob to correspondingly lengthen or shorten the headband, thereby allowing the user to wear the head-mounted display device.

However, regardless of using the Velcro tape or the gear plus the knob to provide the headband for the user to wear the head-mounted display device, the user has to spend more time and effort to adjust the headband, i.e. to wear the head-mounted display devices is not convenient at present, which affects the user's experience of using the head-mounted display device.

SUMMARY

The application provides a head-mounted display device, which is capable of automatically adjusting a length of a wearable assembly to help improving user's convenience in wearing the head-mounted display device.

A head-mounted display device of the application including a wearable assembly, an adjusting module and a control module, the wearable assembly is suitable for wearing to a head of a user. The adjusting module is movably coupled to the wearable assembly, and includes a transmission mechanism and a driving element. The transmission mechanism is movably coupled to the wearable assembly, and the driving element is coupled to the transmission mechanism. The control module is electrically connected to the driving element. When the control module outputs a control signal to the driving element, the driving element drives the transmission mechanism to actuate, such that the transmission mechanism drives the wearable assembly along with driving of the driving element to change a girth of the wearable assembly to fit heads of different users.

Based on the above description, in the head-mounted display device of the application, the head-mounted display device includes the wearable assembly, the adjusting module and the control module, and the wearable assembly is suitable for wearing to the head of the user. When the user inputs the control signal to the driving element through the control module, the driving element drives the transmission mechanism to actuate, such that the transmission mechanism drives the wearable assembly along with driving of the driving element to change the girth of the wearable assembly to fit the head of a different user. According to this, the head-mounted display device is capable of automatically adjusting the length of the wearable assembly to help improving user's convenience in wearing the head-mounted display device.

To make the aforementioned features and advantages of the application more comprehensible, several embodiments accompanied with drawings are described in detail as follows.

DESCRIPTION OF THE EMBODIMENTS

Figure 1:
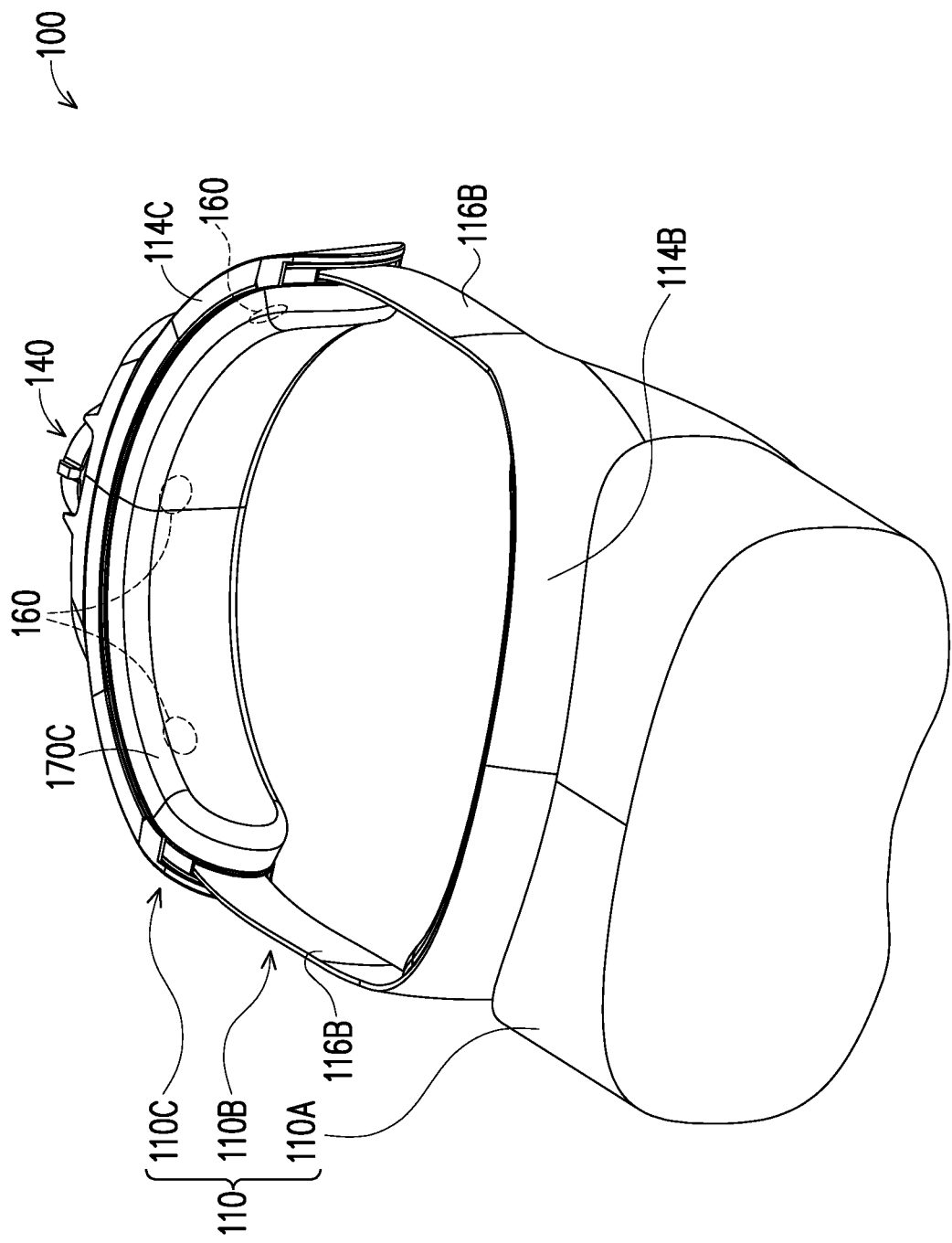
FIG. 1 is a schematic three-dimensional view of a head-mounted device according to an embodiment of the application.
Figure 2:
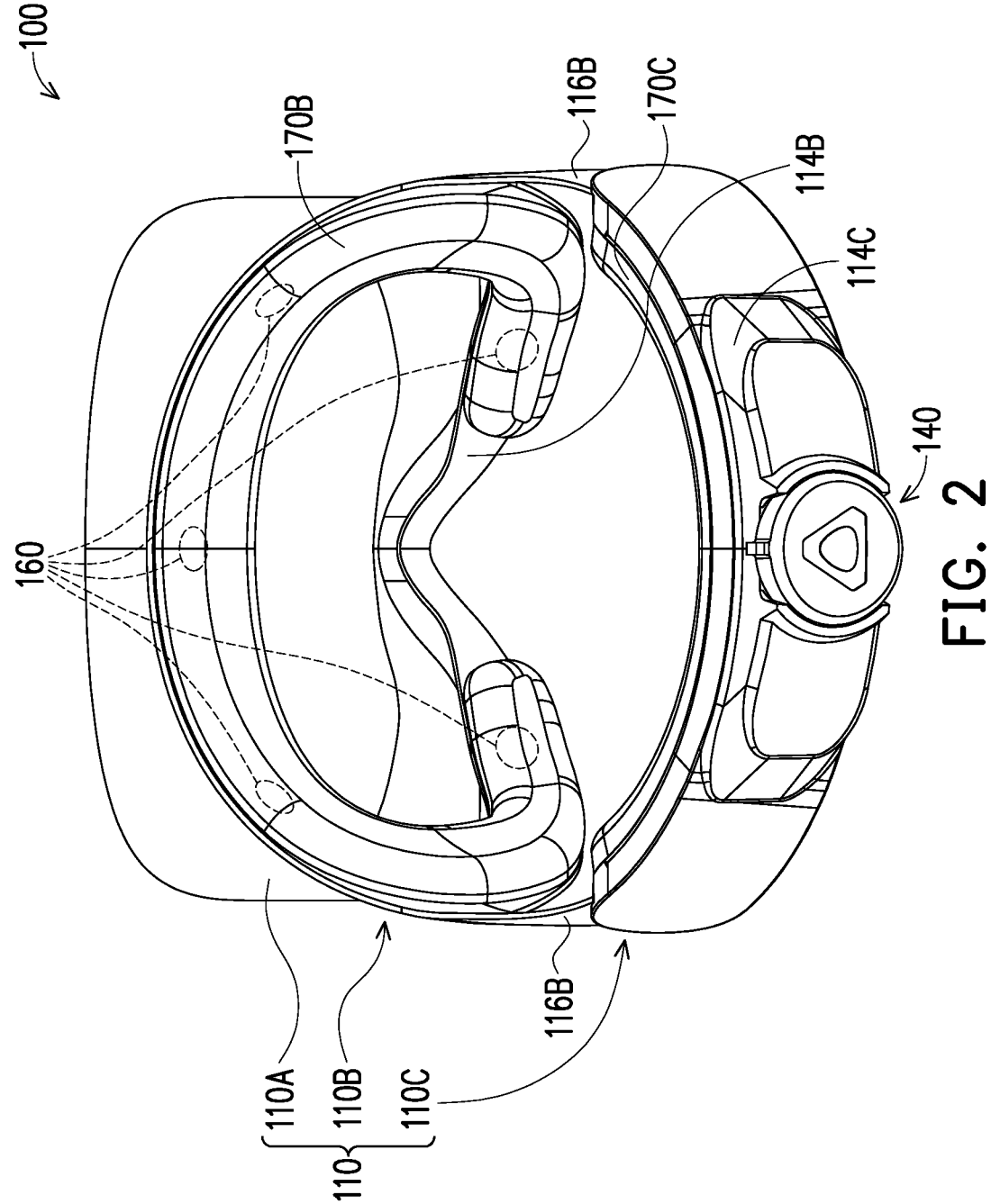
FIG. 2 is a schematic three-dimensional view of the head-mounted device of FIG. 1 according to another viewing angle.
Figure 3:
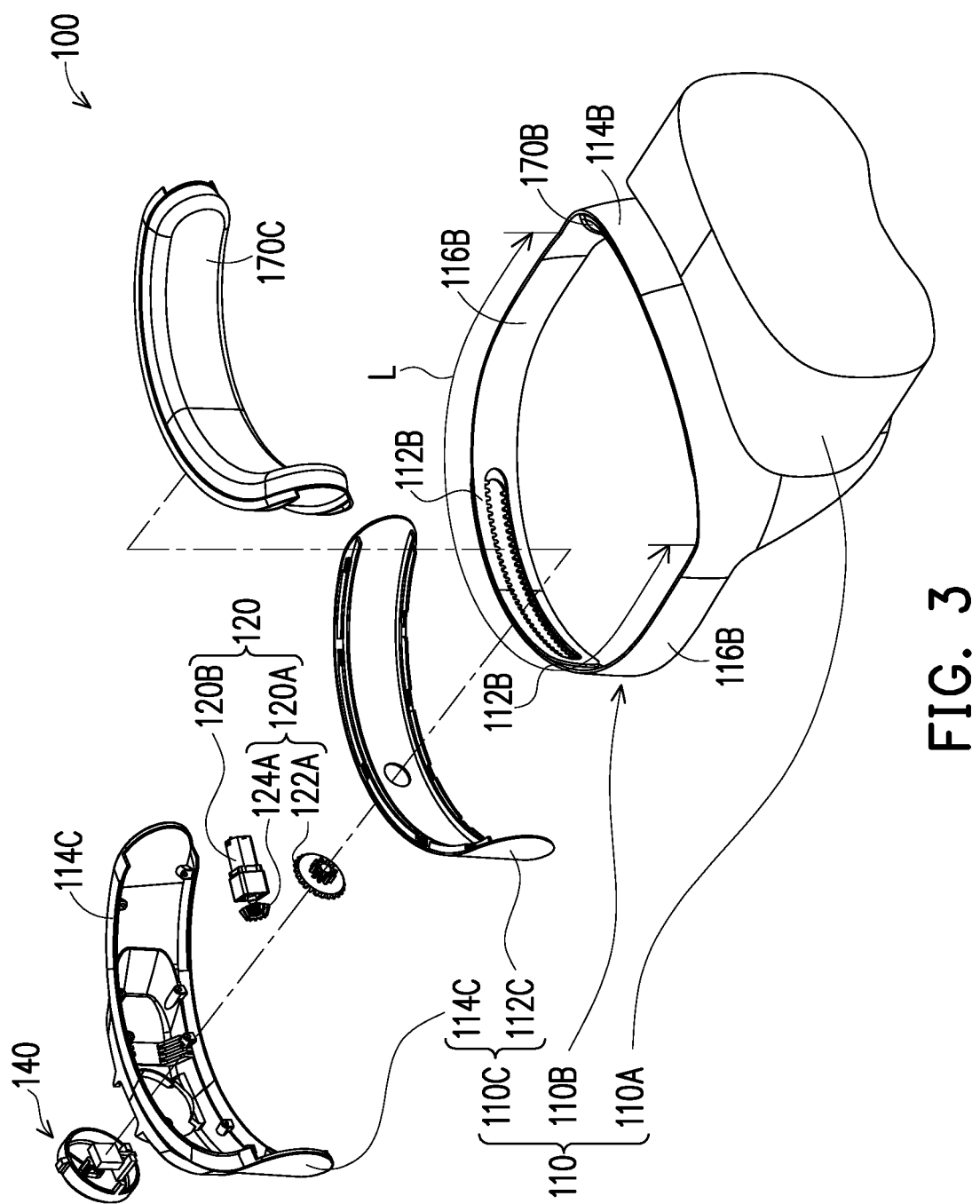
FIG. 3 is an exploded view of the head-mounted device of FIG. 1.

FIG. 1 is a schematic three-dimensional view of a head-mounted device according to an embodiment of the application. FIG. 2 is a schematic three-dimensional view of the head-mounted device of FIG. 1 according to another viewing angle. FIG. 3 is an exploded view of the head-mounted device of FIG. 1. Referring to FIG. 1 to FIG. 3, the head-mounted device 100 of the embodiment includes a wearable assembly 110, an adjusting module 120 and a control module 130. The adjusting module 120 includes a transmission mechanism 120A and a driving element 120B, and the adjusting module 120 is movably coupled to the wearable assembly 110 through the transmission mechanism 120A, and the driving element 120B is further coupled to the transmission mechanism 120A. In the embodiment, the driving element 120B is, for example, a motor, but is not limited thereto. The control module 130 is electrically connected to the driving element 120B, and is adapted to input a control signal to the driving element 120B. A user may wear the head-mounted display device 100 to the head through the wearable assembly 110. When the user wants to adjust a girth L of the wearable assembly 110, the control module 130 may be enabled to input a control signal to the driving element 120B. After receiving the control signal, the driving element 120B drives the transmission mechanism 120A to actuate, such that the transmission mechanism 120A drives the wearable assembly 110 to change the girth L of the wearable assembly 110 along with driving of the driving element 120B, so as to make the wearable assembly 100 to fit heads of different users. According to this, through the cooperation of the adjusting module 120 and the control module 130, the head-mounted display device 100 may automatically adjust the girth L of the wearable assembly 110, so as to improve user's convenience in using the head-mounted display device 100, and avails improving user's experience of using the head-mounted display device 100.

In detail, the wearable assembly 110 includes a main body 110A, a headband 110B and a movable casing 110C. The main body 110A may be built-in with or additionally equipped with a display (not shown) in internal thereof, and when the user wears the head-mounted display device 100, the display (not shown) may project images to the eyes of the users.

The headband 110B includes an eye contact portion 114B and a pair of flexible extension portions 116B. The headband 110B is connected to the main body 110A through the eye contact portion 114B. When the user wears the head-mounted display device 100, the eye contact portion 114B covers the eyes of the user, and a display image projected by the display (not shown) in the main body 110A may pass through the eye contact portion 114B for projecting to the eyes of the user. The pair of flexible extension portions 116B are respectively connected to two opposite ends of the eye contact portion 114B, and ends of the pair of flexible extension portions 116B have a pair of driven portions 112B. The pair of driven portions 112B of the pair of flexible extension portions 116B are overlapped with each other, and the pair of flexible extension portions 116B and the main body 110A are respectively located at two opposite sides of the eye contact portion 114B. In the embodiment, the headband 110B is, for example, made of flexible plastic, so that the transmission mechanism 120A may change the girth L of the headband 110B. However, the material of the headband 110B is not limited thereto as long as the headband 110B can be bent to fit different head shapes.

The movable casing 110C includes an inner casing 112C and an outer casing 114C. The inner casing 112C is movably connected to the pair of flexible extension portions 116B of the headband 110B, and covers the pair of driven portions 112B. The outer casing 114C is fixed to the inner casing 112C.

Figure 4:
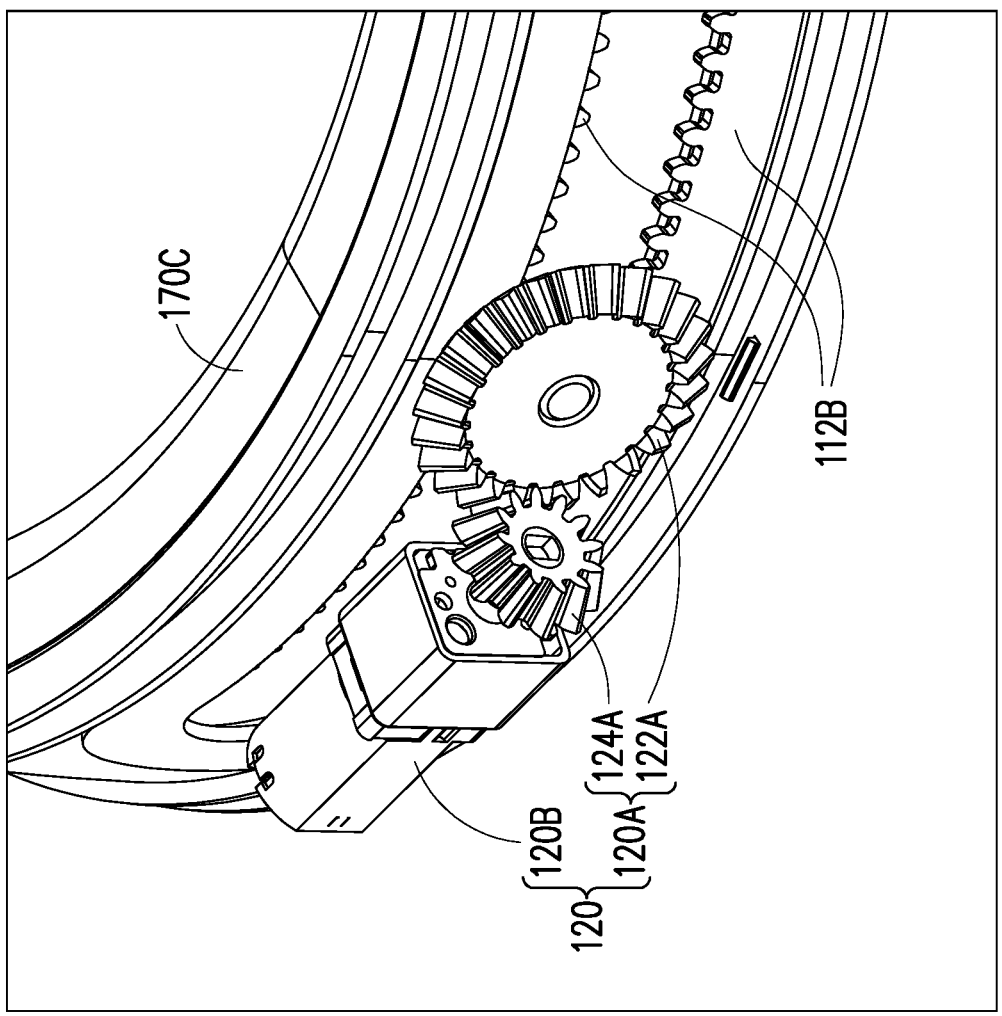
FIG. 4 and FIG. 5 are partial schematic diagrams of the head-mounted display device of FIG. 1 with a part of components omitted.
Figure 5:
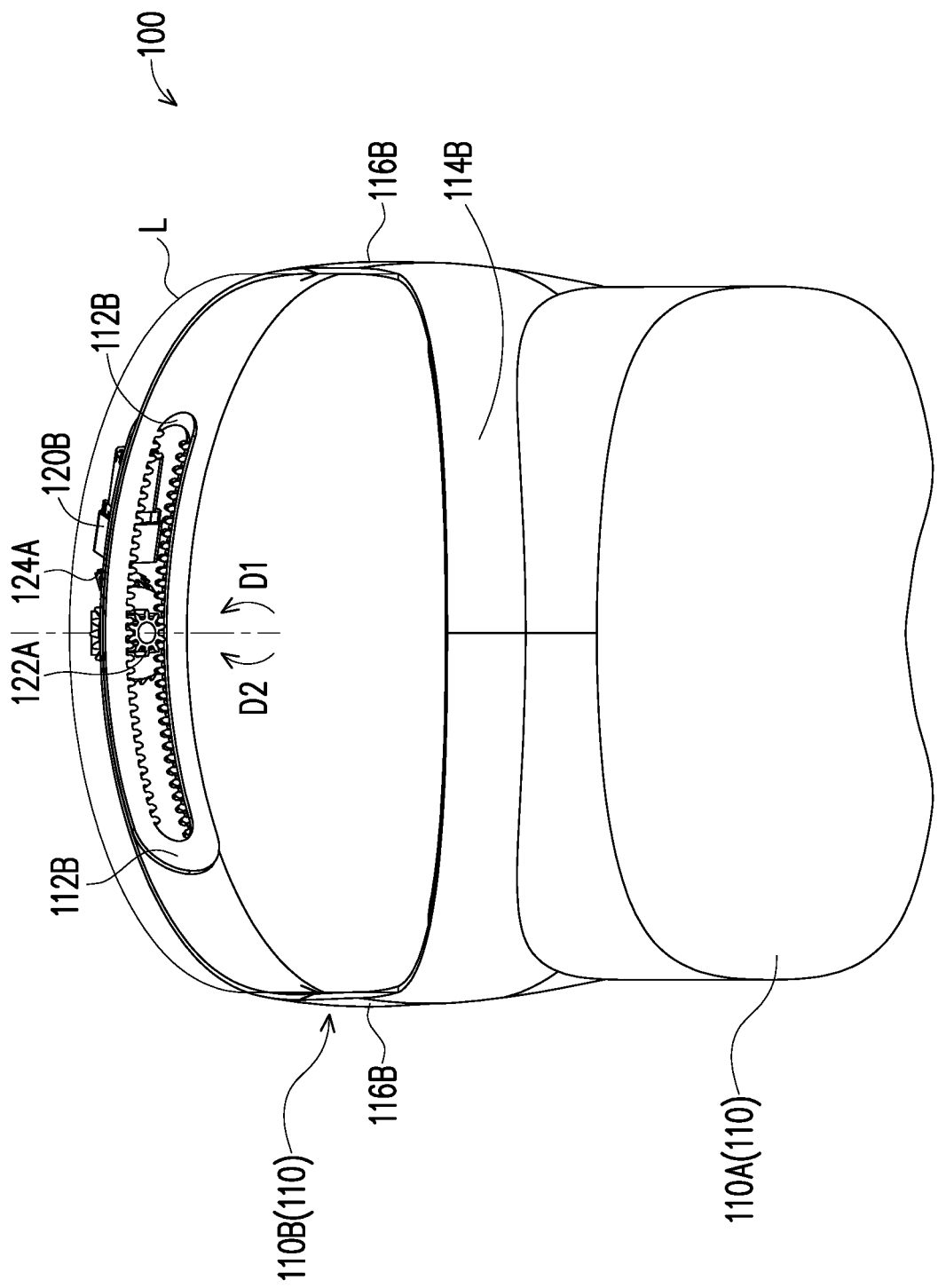

FIG. 4 and FIG. 5 are partial schematic diagrams of the head-mounted display device of FIG. 1 with a part of components omitted. Referring to FIG. 3 to FIG. 5, the transmission mechanism 120A includes an actuator 122A and a transmission member 124A. The driving element 120B is fixed to the outer casing 114C of the movable casing 110C, and the transmission member 124A is coupled to the driving element 120B, and the driving element 120B is adapted to drive the transmission member 124A to rotate. The actuator 122A is rotatably disposed in the inner casing 112C of the movable casing 110C. One end of the actuator 122A is coupled to the transmission member 124A and is adapted to be driven by the transmission member 124A to rotate, and another end of the actuator 122A is coupled to the pair of driven portions 112B of the headband 110B for driving the pair of driven portions 112B. In the embodiment, the transmission member 124A and the actuator 122A include gears, which are, for example, bevel gears, and the driven portions 112B includes gear racks corresponding to the actuator 122A. In other embodiments, the transmission mechanism 120A may be a combination of a belt and a pulley, and the type of the transmission mechanism is not limited in the application.

In the embodiment, the head-mounted display device 100 may further include at least one soft cushion (for example, a soft cushion 170B and a soft cushion 170C). As shown in FIG. 3, the soft cushion 170B may be disposed on the eye contact portion 114B of the wearable assembly 110, and is configured to contact a face of the user to provide cushioning and enhance the comfort of the user wearing the head-mounted display device 100. The soft cushion 170C may be disposed on the inner casing 112C of the wearable assembly 110, and is configured to contact an occipital bone of the user to provide cushioning and enhance the comfort of the user wearing the head-mounted display device 100. In other embodiments, the number of the soft cushions may be one or plural, and configuration positions thereof may also be at two sides, and the number and configuration positions of the soft cushions are not limited in the application.

Figure 6:
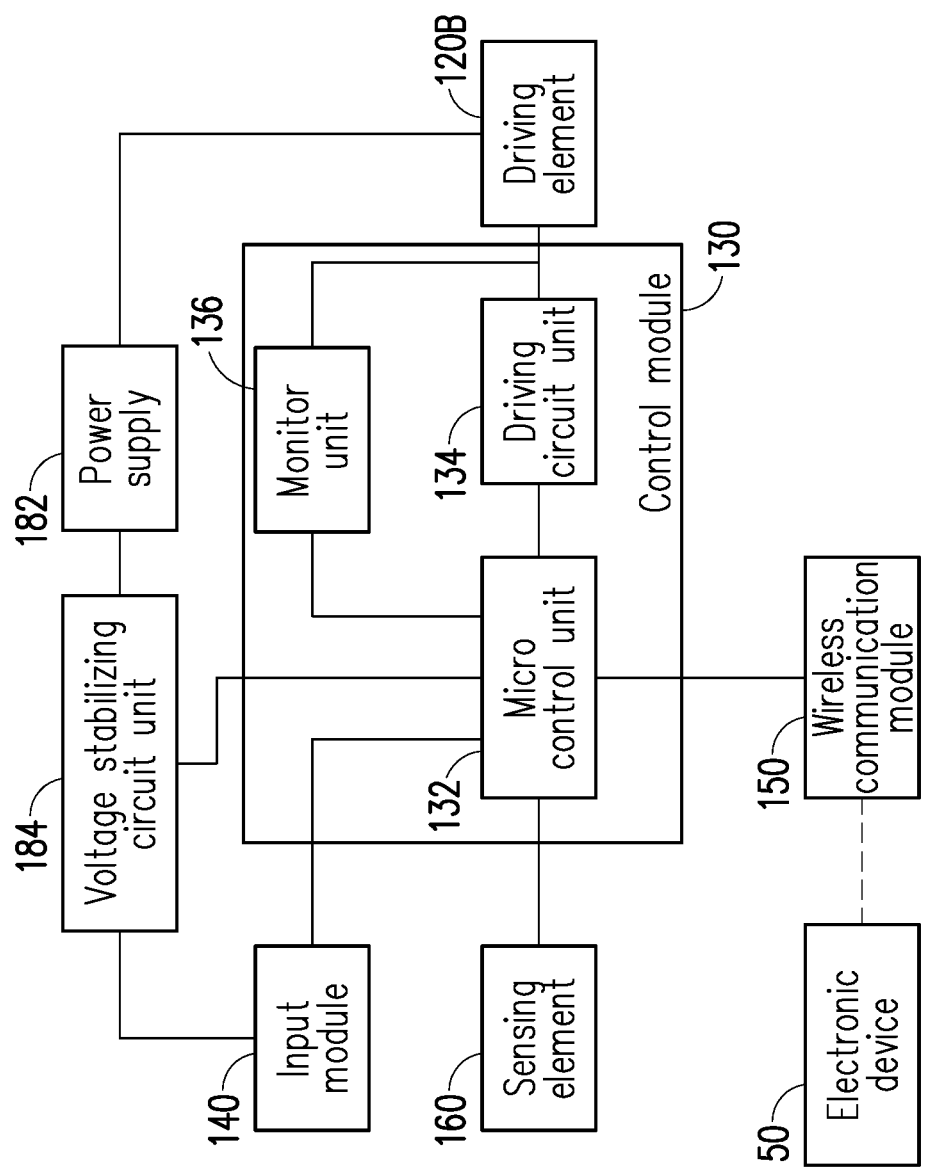
FIG. 6 is a circuit block diagram of the head-mounted display device of FIG. 1.

FIG. 6 is a circuit block diagram of the head-mounted display device of FIG. 1. Referring to FIG. 3, FIG. 4 and FIG. 6, the control module 130 includes a micro control unit 132, a driving circuit unit 134 and a monitor unit 136. The driving circuit unit 134 is electrically connected to the micro control unit 132 and the driving element 120B. The monitor unit 136 is electrically connected to the micro control unit 132 and between the driving circuit unit 134 and the driving element 120B. The monitor unit 136 is configured to sense a motor current between the driving circuit unit 134 and the driving element 120B.

The head-mounted display device 100 may further include a power supply 182 and a voltage stabilizing circuit unit 184. The power supply 182 is electrically connected to the driving element 120B to supply power to the driving element 120B. The voltage stabilizing circuit unit 184 is electrically connected to the power supply 182 and the micro control unit 132.

In the embodiment, the head-mounted display device 100 further includes an input module 140, a wireless communication module 150 and at least one sensing element 160. The input module 140 is electrically connected to the micro control unit 132 of the control module 130, and is configured to receive an instruction of the user to correspondingly generate a signal. In the embodiment, the input module 140 is, for example, disposed in the outer casing 114C of the movable casing 110C, and is, for example, a rotatable single knob. In other embodiments, the input module 140 may be a push button or a push-pull button, and the number of operation keys thereof may be plurality, and the type of the input module is not limited as long as the user may input an instruction to the micro control unit 132 of the control module 130.

The wireless communication module 150 is electrically connected to the micro control unit 132 of the control module 130, and is configured to receive an instruction from an external electronic device 50 to correspondingly generate a signal. In the embodiment, the electronic device 50 is a desktop computer host. In other embodiments, the electronic device may also be a notebook, a tablet computer or a smart phone.

In the embodiment, the at least one sensing element 160 may be disposed in the wearable assembly 110 (for example, disposed in the soft cushion 170B and/or the soft cushion 170C) to electrically connect the micro control unit 132 of the control module 130, and is configured to sense a pressure, tension or deformation suffered by the wearable assembly 110. In the embodiment, the at least one sensing element 160 is, for example, a pressure sensor used for sensing a pressure on the wearable assembly 110, a tension sensor used for sensing a tension of the headband 110B, or a strain gauge used for sensing deformation of the headband 110B, and the number of the at least one sensing element 160 is, for example, plural, and the sensing elements 160 are all disposed in the soft cushion 170B and the soft cushion 170C. In other embodiments, the type and number of the sensing elements 160 are not specifically limited. For the sake of explanation, only a single sensing element 160 is used for description.

Figure 7:
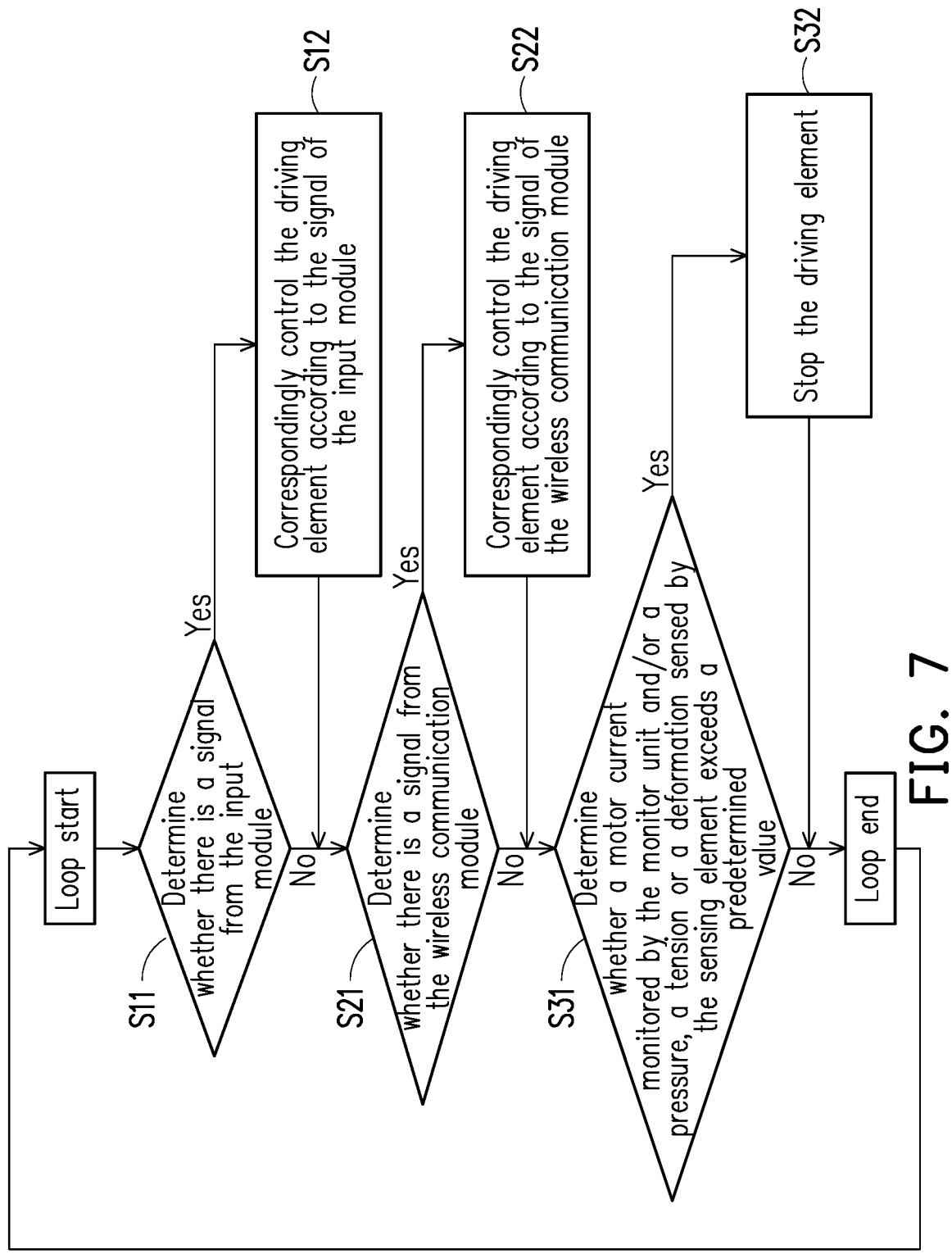
FIG. 7 is a flowchart illustrating an operation of the head-mounted display device of FIG. 1.

FIG. 7 is a flowchart illustrating an operation of the head-mounted display device of FIG. 1. Referring to FIG. 3, FIG. 6 and FIG. 7, the operation of the head-mounted display device 100 of the embodiment is described below. The micro control unit 132 of the control module 130 is configured to receive signals generated by the input module 140, the wireless communication module 150, the monitor unit 136 and/or the sensing element 160, and correspondingly control the operation of the driving element 120B according to the signals transmitted by the input module 140, the wireless communication module 150, the monitor unit 136 and/or the sensing element 160.

Further, referring to FIG. 5, FIG. 6 and FIG. 7, after starting a loop, the micro control unit 132 first executes a step S11, in which the micro control unit 132 determines whether there is a signal from the input module 140. When the signal is transmitted from the input module 140 to the micro control unit 132 of the control module 130, a step S12 is executed, in which the micro control unit 132 correspondingly controls the driving element 120B according to the signal of the input module 140. The micro control unit 132 determines a type of the signal. For example, when the signal is a signal for controlling shortening of the headband 110B, the micro control unit 132 may control the operation of the driving element 120B through the driving circuit unit 134. Along with the operation of the driving element 120B, the transmission member 124A is accordingly rotated to drive the actuator 122A to actuate along a first actuation direction D1, such that an overlapping area of the pair of driven portions 112B of the headband 110B is increased, so as to shorten the girth L of the headband 110B. Conversely, when the signal is a signal for controlling loosening of the headband 110B, the micro control unit 132 may control the operation of the driving element 120B through the driving circuit unit 134. Along with the operation of the driving element 120B, the transmission member 124A is accordingly rotated to drive the actuator 122A to actuate along a second actuation direction D2 opposite to the first actuation direction D1, such that the overlapping area of the pair of driven portions 112B of the headband 110B is decreased, so as to increase the girth L of the headband 110B.

After executing the step S11 or S12, a step S21 is executed, in which the micro control unit 132 determines whether there is a signal from the wireless communication module 150. When the micro control unit 132 of the control module 130 determines that the signal is from the wireless communication module 150, a step S22 is executed, in which the micro control unit 132 correspondingly controls the driving element 120B according to the signal of the wireless communication module 150. The micro control unit 132 may determine a type of the signal, and control the driving element 120B and the transmission mechanism 120A to shorten or loosen the headband 110B through the driving circuit unit 134. When the user wears the head-mounted display device 100 to play a game, shortening or loosening of the headband 110B may be directly controlled through the electronic device 50 and the wireless communication module 150, or the electronic device 50 may also provide a signal to the wireless communication module 150 to make the head-mounted display device 100 to correspondingly vibrate.

After the step S21 or S22 is executed, a step S31 is executed, in which the micro control unit 132 determines whether the motor current monitored by the monitor unit 136 exceeds a predetermined value. When the micro control unit 132 of the control module 130 determines that the motor current exceeds the predetermined value, a step S32 is executed, in which the micro control unit 132 stops the driving element 120B. For example, when the headband 110B is continuously shortened or loosened, since the driving element 120B continuously operates, the motor current between the driving circuit unit 134 and the driving element 120B is in a lower value. The micro control unit 132 obtains the motor current through the monitor unit 136, and determines that the motor current does not exceed the predetermined value, so that the micro control unit 132 does not interfere the operation of the driving element 120B, and the driving element 120B continuously operates. When the headband 110B stops shortening or loosening, since the driving element 120B stops operating, the motor current between the driving circuit unit 134 and the driving element 120B is increased. Now, the micro control unit 132 obtains the motor current through the monitor unit 136, and determines that the motor current exceeds the predetermined value, and the micro control unit 132 stops the driving element 120B through the driving circuit unit 134.

In other words, the micro control unit 132 may obtain the motor current between the driving circuit unit 134 and the driving element 120B through the monitor unit 136, and determine whether the motor current exceeds the predetermined value. In this way, the micro control unit 132 may indirectly learn whether the headband 110B is too tight, so as to correspondingly stop the driving element 120B. In this way, the headband 110B can be avoided to be continuous shortened to cause discomfort of the user. After the step S31 or S32 is executed, the present loop is ended and another loop may be started.

In the embodiment, the head-mounted display device 100 may also use the sensing element 160 to replace the aforementioned monitor unit 136. After the step S21 or S22 is executed, the step S31 is executed, in which the micro control unit 132 determines whether a pressure, a tension or a deformation sensed by the sensing element 160 exceeds a predetermined value. For example, when the micro control unit 132 determines that the pressure, the tension or the deformation sensed by the sensing element 160 exceeds the predetermined value, the micro control unit 132 may indirectly learn that the headband 110B has reached a shortened state. Moreover, in order to avoid continuous shortening of the headband 110B to cause discomfort of the user, the micro control unit 132 may correspondingly stop the driving element 120B through the driving circuit unit 134. If the micro control unit 132 of the control module 130 determines that the sensed pressure, tension or deformation does not exceed the predetermined value, the micro control unit 132 ends the determination flow or enters a next determination flow. In other embodiments, a sequence that the micro control unit 132 of the control module 130 determines the signals of the input module 140, the wireless communication module 150 and the sensing element 160 is not particularly specified, which is determined according to a requirement.

In the embodiment, the head-mounted display device 100 may also be configured with the monitor unit 136 and the sensing element 160 at the same time. After the step S21 or S22 is executed, the step S31 is executed, in which the micro control unit 132 determines whether the motor current and/or the pressure, the tension or the deformation exceeds the predetermined value. Operation principles of the monitor unit 136 and the sensing element 160 have described above, and it is not repeated here again.

For example, in the steps S31 and S32, the micro control unit 132 may stop the driving element 120B in the situation of determining that the motor current monitored by the monitor unit 136 exceeds the predetermined value, and also may stop the driving element 120B in the situation of determining that the pressure, the tension or the deformation sensed by the sensing element 160 exceeds the predetermined value, or stop the driving element 120B in the situation of determining that the motor current monitored by the monitor unit 136 exceeds the predetermined value and the pressure, the tension or the deformation sensed by the sensing element 160 exceeds the predetermined value. In other words, the micro control unit 132 may correspondingly stop the driving element 120B when at least one of the motor current monitored by the monitor unit 136 and the pressure, the tension or the deformation sensed by the sensing element 160 exceeds the predetermined value.

In brief, when the control module 130 receives a signal, the control module 130 would control the driving element 120B to drive the transmission mechanism 120A to actuate along an actuation direction (for example, the first actuation direction D1 or the second actuation direction D2) according to the signal, such that the transmission mechanism 120A drives the overlapping area of the pair of driven portions 112B of the wearable assembly 110 to be increased along with driving of the driving element 120B, so as to shorten the girth L (shown in FIG. 3) of the headband 110B of the wearable assembly 110, or the transmission mechanism 120A drives the overlapping area of the pair of driven portions 112B of the wearable assembly 110 to be decreased along with driving of the driving element 120B, so as to increase the girth L of the headband 110B of the wearable assembly 110.

In other embodiments, a sequence of executing the steps S11, S21 and S31 is not particularly specified, which is determined according to a requirement. For example, the step S21 may be first executed, and then the step S11 is executed.

In another embodiment, the steps S21 and S22 may be omitted. After the loop is started, the step S11 is first executed, in which the micro control unit 132 determines whether there is a signal from the input module 140, and correspondingly controls the driving element 120B according to the signal of the input module 140 as in step S12. Then, the steps S21 and S22 are omitted to directly execute the step S31, in which the micro control unit 132 determines whether the motor current monitored by the monitor unit 136 and/or the pressure, the tension or the deformation sensed by the sensing element 160 exceeds the predetermined value, and correspondingly stops the driving element 120B as in step S32.

In another embodiment, the steps S11 and S12 may be omitted. After the loop is started, the steps S11 and S12 are omitted to directly execute the step S21, in which the micro control unit 132 determines whether there is a signal from the wireless communication module 150, and correspondingly controls the driving element 120B according to the signal of the wireless communication module 150 as in step S22. Then, the step S31 is executed, in which the micro control unit 132 determines whether the motor current monitored by the monitor unit 136 and/or the pressure, the tension or the deformation sensed by the sensing element 160 exceeds the predetermined value, and correspondingly stops the driving element 120B as in step S32.

Figure 8:
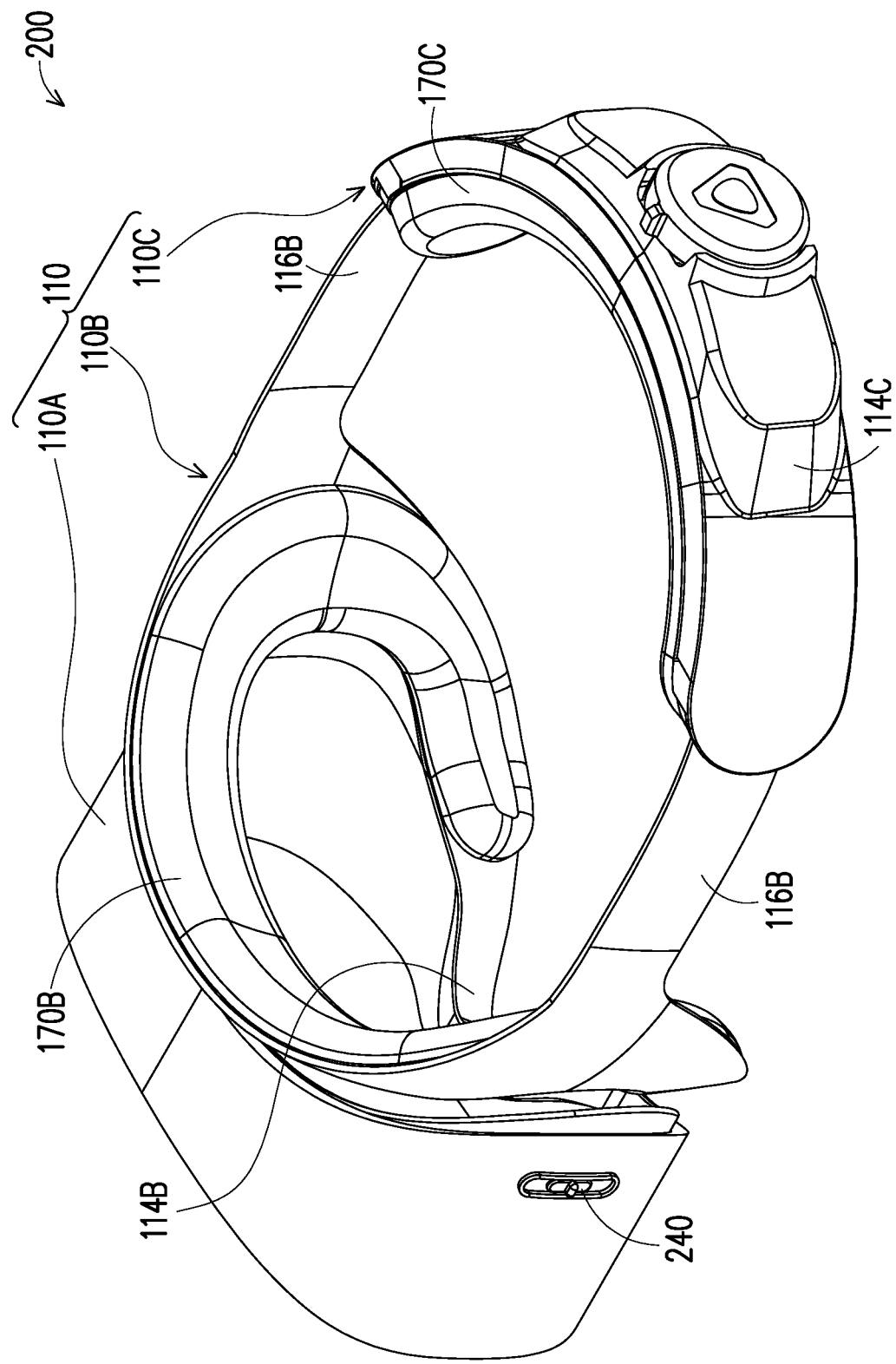
FIG. 8 is a schematic three-dimensional view of a head-mounted display device according to another embodiment of the application.

FIG. 8 is a schematic three-dimensional view of a head-mounted display device according to another embodiment of the application. Referring to FIG. 8, in the head-mounted display device 200 of FIG. 8 and the head-mounted display device 100 of FIG. 1, the same symbol is used for representing the same configuration and mode of operation, and it is not repeated here. A difference between the head-mounted display device 200 of FIG. 8 and the head-mounted display device 100 of FIG. 1 is that the input module 240 of the head-mounted display device 200 of the embodiment is disposed in the main body 110A of the wearable assembly 110, and the input module 240 may be a single-key switch, and the input module 240 may have two switching positions, one of which may shorten the headband 110B, and the other may loosen the headband 110B.

Figure 9:
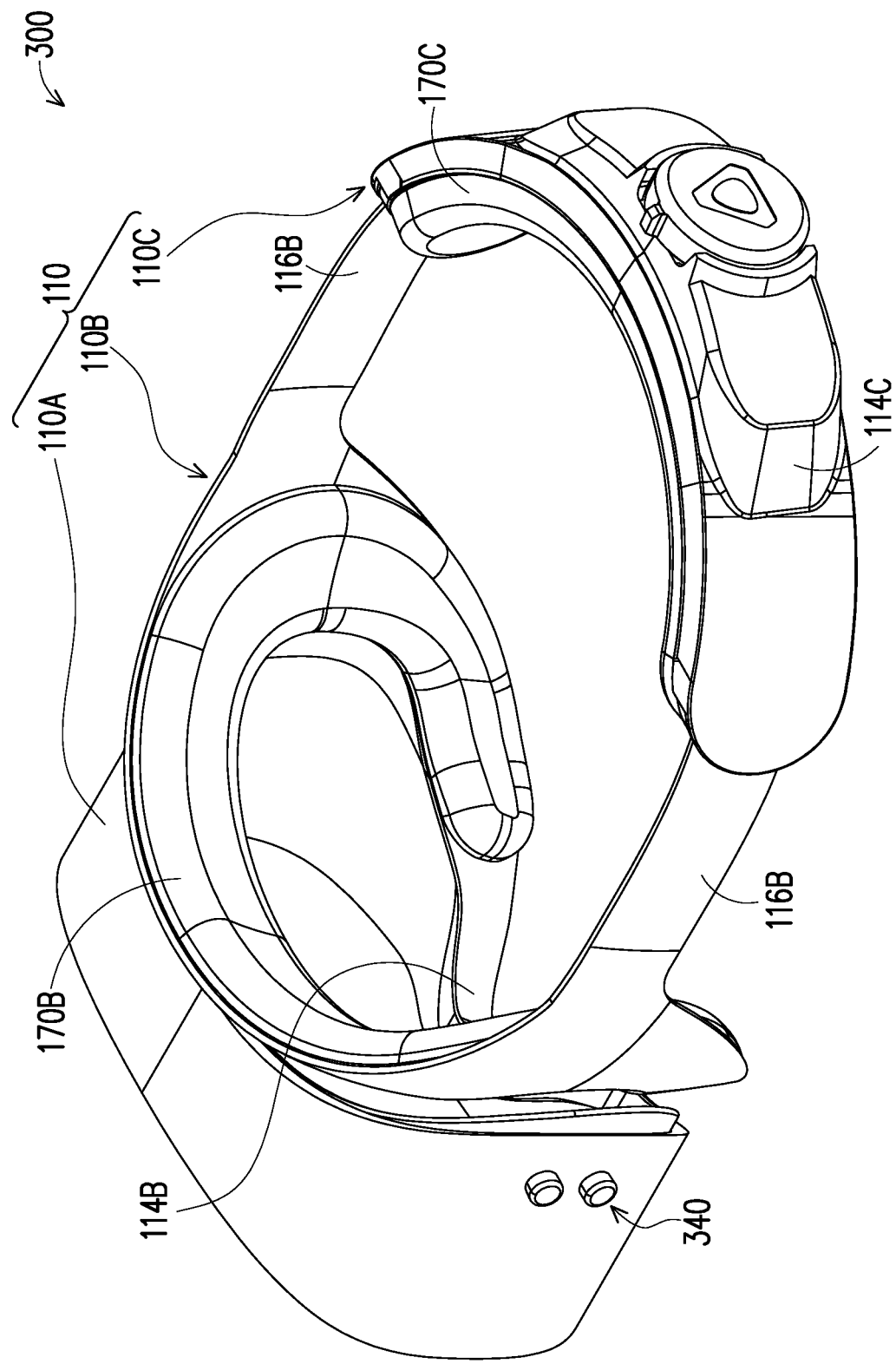
FIG. 9 is a schematic three-dimensional view of a head-mounted display device according to still another embodiment of the application.

FIG. 9 is a schematic three-dimensional view of a head-mounted display device according to still another embodiment of the application. Referring to FIG. 9, in the head-mounted display device 300 of FIG. 9 and the head-mounted display device 200 of FIG. 8, the same symbol is used for representing the same configuration and mode of operation, and it is not repeated here. A difference between the head-mounted display device 300 of FIG. 9 and the head-mounted display device 200 of FIG. 8 is that the input module 340 is a button-type switch and includes two buttons, one button of which may shorten the headband 110B, and the other button can loosen the headband 110B.

In summary, in the head-mounted display device of the application, when the user wants to adjust the girth of the wearable assembly, the control module may output a control signal to the driving element, and the driving element after receiving the control signal may drive the transmission mechanism to actuate, such that the transmission mechanism drives the wearable assembly along with driving of the driving element to change the girth of the wearable assembly so as to make the wearable assembly fit the head of a different user. According to this, the head-mounted display device is capable of automatically adjusting the girth of the wearable assembly through the coordination of the adjusting module and the control module, which improves user's convenience in wearing the head-mounted display device, and helps improving the user's use experience in using the head-mounted display device.

Although the application has been disclosed by the above embodiments, they are not intended to limit the application. It is apparent to one of ordinary skill in the art that modifications and variations to the application may be made without departing from the spirit and scope of the application. Accordingly, the protection scope of the application will be defined by the appended claims.

What is claimed is:

1. A head-mounted display device, comprising:
a wearable assembly, suitable for wearing to a head of a user;
an adjusting module, movably coupled to the wearable assembly, and comprising:
a transmission mechanism, movably coupled to the wearable assembly; and
a driving element, coupled to the transmission mechanism; and
a control module, electrically connected to the driving element,
wherein when the control module outputs a control signal to the driving element, the driving element drives the transmission mechanism to actuate, such that the transmission mechanism drives the wearable assembly along with driving of the driving element to change a girth of the wearable assembly to fit the head of the user,
wherein the wearable assembly comprises:
a main body, adapted to project a display image to eyes of the user;
a headband, connected to the main body, wherein two opposite ends of the headband are overlapped with each other, and the two opposite ends of the headband are adapted to change an overlapping area to change a girth of the headband, so as to fit heads of different users; and
a movable casing, movably connected to the headband, wherein the adjusting module is movably coupled to the movable casing,
wherein the control module is adapted to control the driving element including a motor to drive the transmission mechanism to actuate along a first actuation direction, and the transmission mechanism is adapted to drive the overlapping area of the two opposite ends of the headband to be increased along with driving of the driving element, so as to shorten the girth of the headband,
wherein the headband has a pair of driven portions, respectively disposed at the two opposite ends of the headband, and the transmission mechanism comprises:
an actuator, movably disposed in the movable casing, and coupled to the pair of driven portions; and
a transmission member, coupled to the driving element, and coupled to the actuator,
wherein the actuator and the transmission member are bevel gears coupled to each other.

2. The head-mounted display device as claimed in claim 1, further comprising:
an input module, electrically connected to the control module, and configured to receive an instruction from the user to correspondingly generate a signal.

3. The head-mounted display device as claimed in claim 1, further comprising:
a wireless communication module, electrically connected to the control module, and configured to receive an instruction from an external electronic device to correspondingly generate a signal.

4. The head-mounted display device as claimed in claim 1, wherein when the control module receives a signal, the control module controls the driving element to drive the transmission mechanism to actuate along an actuation direction according to the signal, such that the transmission mechanism drives the overlapping area of two opposite ends of the wearable assembly to be increased along with driving of the driving element, so as to shorten a girth of the wearable assembly.

5. The head-mounted display device as claimed in claim 1, wherein when the control module receives a signal, the control module controls the driving element to drive the transmission mechanism to actuate along an actuation direction according to the signal, such that the transmission mechanism drives the overlapping area of two opposite ends of the wearable assembly to be decreased along with driving of the driving element, so as to increase a girth of the wearable assembly.

6. The head-mounted display device as claimed in claim 1, wherein the control module comprises:
a micro control unit;
a driving circuit unit, electrically connected to the micro control unit and the driving element; and
a monitor unit, electrically connected to the micro control unit and between the driving circuit unit and the driving element, and configured to monitor a motor current between the driving circuit unit and the driving element, wherein when the micro control unit determines that the motor current monitored by the monitor unit exceeds a predetermined value, the micro control unit correspondingly stops the driving element through the driving circuit unit.

7. The head-mounted display device as claimed in claim 1, further comprising:
at least one sensing element, disposed in the wearable assembly, and electrically connected to the control module to sense a pressure, a tension or a deformation on the wearable assembly, wherein when the control module determines that the pressure, the tension or the deformation sensed by the at least one sensing element exceeds a predetermined value, the control module correspondingly stops the driving element.

8. The head-mounted display device as claimed in claim 1, further comprising:
a micro control unit;
a driving circuit unit, electrically connected to the micro control unit and the driving element;
a monitor unit, electrically connected to the micro control unit and between the driving circuit unit and the driving element, and configured to monitor a motor current between the driving circuit unit and the driving element; and
at least one sensing element, disposed in the wearable assembly, and electrically connected to the control module to sense a pressure, a tension or a deformation on the wearable assembly,
wherein when the micro control unit determines that the motor current monitored by the monitor unit exceeds a predetermined value or the pressure, the tension or the deformation sensed by the at least one sensing element exceeds a predetermined value, the micro control unit correspondingly stops the driving element through the driving circuit unit.

9. The head-mounted display device as claimed in claim 1, further comprising:
a soft cushion, disposed on the wearable assembly, and adapted to contact the head of the user.

10. The head-mounted display device as claimed in claim 1, wherein the control module is adapted to control the driving element to drive the transmission mechanism to actuate along a second actuation direction opposite to the first actuation direction, and the transmission mechanism is adapted to drive the overlapping area of the two opposite ends of the headband to be decreased along with driving of the driving element, so as to increase the girth of the headband.

11. The head-mounted display device as claimed in claim 1, wherein the transmission member is adapted to be driven by the driving element to drive the actuator to actuate, and the actuator is adapted to actuate the pair of the driven portions to change the overlapping area of the headband, so as to change the girth of the headband.

12. The head-mounted display device as claimed in claim 1, wherein the movable casing comprises:
   an inner casing, movably connected to the headband; and
   an outer casing, fixed to the inner casing, wherein the actuator is rotatably disposed in the inner casing, and the driving element is fixed to the outer casing.

13. The head-mounted display device as claimed in claim 1, wherein the headband comprises:
   an eye contact portion, connected to the main body, and adapted to cover the eyes of the user; and
   a pair of flexible extension portions, respectively connected to two opposite ends of the eye contact portion, and ends of the pair of flexible extension portions being overlapped with each other.

* * * * *